United States Patent
Costa

(10) Patent No.: US 10,480,530 B2
(45) Date of Patent: Nov. 19, 2019

(54) FAN CONTAINMENT CASE FOR GAS TURBINE ENGINES

(71) Applicant: United Technologies Corporation, Farmington, CT (US)

(72) Inventor: Mark W. Costa, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 153 days.

(21) Appl. No.: 15/686,255

(22) Filed: Aug. 25, 2017

(65) Prior Publication Data

US 2019/0063460 A1  Feb. 28, 2019

(51) Int. Cl.

| | | |
|---|---|---|
| F04D 29/52 | (2006.01) | |
| F02K 3/06 | (2006.01) | |
| F01D 21/04 | (2006.01) | |
| F01D 11/12 | (2006.01) | |
| F04D 29/02 | (2006.01) | |

(52) U.S. Cl.
CPC .......... F04D 29/526 (2013.01); F01D 11/122 (2013.01); F01D 21/045 (2013.01); F02K 3/06 (2013.01); F04D 29/023 (2013.01); F05D 2220/323 (2013.01); F05D 2220/36 (2013.01); F05D 2230/60 (2013.01); F05D 2240/14 (2013.01); F05D 2240/15 (2013.01); F05D 2240/20 (2013.01); F05D 2250/283 (2013.01); F05D 2300/603 (2013.01)

(58) Field of Classification Search
CPC .... F01D 11/122; F01D 21/045; F04D 29/023; F04D 29/526; F05D 2220/323; F05D 2220/36; F05D 2240/14; F05D 2240/15; F05D 2300/603; F02K 3/06
See application file for complete search history.

(56) References Cited

U.S. PATENT DOCUMENTS

| | | |
|---|---|---|
| 4,534,698 A | 8/1985 | Tomich |
| 6,652,222 B1 | 11/2003 | Wojtyczka et al. |
| 2008/0145215 A1* | 6/2008 | Finn ............. F01D 21/045 415/200 |

(Continued)

FOREIGN PATENT DOCUMENTS

EP  2711556  3/2014

OTHER PUBLICATIONS

Technical Guide. Kevlar Aramid Fiber. Retrieved Aug. 24, 2017 from: http://www.dupont.com/content/dam/dupont/products-and-services/fabrics-fibers-and-nonwovens/fibers/documents/DPT_Kevlar_Technical_Guide_Revised.pdf.

(Continued)

*Primary Examiner* — Erick R Solis

(74) *Attorney, Agent, or Firm* — Carlson, Gaskey & Olds, P.C.

(57) ABSTRACT

A fan section for a gas turbine engine according to an example of the present disclosure includes, among other things, a fan containment case assembly that has an outer case extending about an axis, and a thermally conforming liner assembly radially inward of the outer case. The liner assembly has a shell, a wrap radially outward of the shell, and a ballistic liner between the outer case and the wrap. The wrap has a first fiber construction, and the ballistic liner has a second fiber construction that differs from the first fiber construction in stiffness.

20 Claims, 4 Drawing Sheets

(56) References Cited

U.S. PATENT DOCUMENTS

| | | | |
|---|---|---|---|
| 2010/0077721 A1 | 4/2010 | Marshall | |
| 2011/0076132 A1* | 3/2011 | Bottome | F01D 21/045 |
| | | | 415/9 |
| 2012/0148392 A1* | 6/2012 | Lussier | F01D 25/28 |
| | | | 415/9 |
| 2013/0202424 A1 | 8/2013 | Lussier et al. | |
| 2014/0286748 A1 | 9/2014 | Costa et al. | |
| 2015/0023780 A1 | 1/2015 | Costa et al. | |
| 2015/0118036 A1* | 4/2015 | Ohtani | F01D 25/24 |
| | | | 415/200 |
| 2016/0032833 A1 | 2/2016 | Robertson, Jr. et al. | |
| 2016/0201505 A1* | 7/2016 | Clarkson | F01D 25/243 |
| | | | 415/200 |
| 2016/0333738 A1* | 11/2016 | Ivakitch | F01D 25/24 |
| 2016/0369812 A1 | 12/2016 | Kling et al. | |
| 2017/0191498 A1* | 7/2017 | Guijarro Valencia | |
| | | | B32B 37/12 |
| 2018/0202460 A1* | 7/2018 | Kray | F04D 29/526 |
| 2018/0230855 A1* | 8/2018 | Heeter | B29C 70/00 |
| 2018/0283205 A1* | 10/2018 | Fracchia | F04D 19/002 |

OTHER PUBLICATIONS

Dupont. Kevlar Fibers. Retrieved Jul. 26, 2017 from: http://www.dupont.com/products-and-services/fabrics-fibers-nonwovens/fibers/brands/kevlar/products/dupont-kevlar-fiber.html.

European Search Report for European Patent Application No. 18190743 completed Jan. 4, 2019.

* cited by examiner

FAN CONTAINMENT CASE FOR GAS TURBINE ENGINES

BACKGROUND

This disclosure relates to a fan section for gas turbine engines, and more particularly to containment of liberated fan blades.

Gas turbine engines typically include a fan section, a compressor section, a combustor section and a turbine section. The fan section includes a plurality of fan blades spaced circumferentially to define a plurality of channels. The fan blades compress a portion of incoming air through the channels to produce thrust and also deliver a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Some gas turbine engines include a fan containment case having a ballistic liner that mitigates an initial shear threat from a liberated fan blade. Various portions of the fan containment case may expand or contract during engine operation.

SUMMARY

A fan section for a gas turbine engine according to an example of the present disclosure includes a fan containment case assembly that has an outer case extending about an axis, and a thermally conforming liner assembly radially inward of the outer case. The liner assembly has a shell, a wrap radially outward of the shell, and a ballistic liner between the outer case and the wrap. The wrap has a first fiber construction, and the ballistic liner has a second fiber construction that differs from the first fiber construction in stiffness.

In a further embodiment of any of the foregoing embodiments, the wrap directly contacts an outer diameter of the shell.

In a further embodiment of any of the foregoing embodiments, the first fiber construction of the wrap is made of substantially non-impregnated fibers.

In a further embodiment of any of the foregoing embodiments, the second fiber construction of the ballistic liner is made of resin impregnated fibers.

In a further embodiment of any of the foregoing embodiments, the fibers of the first fiber construction are aramid fibers.

In a further embodiment of any of the foregoing embodiments, the outer case is made of a composite material.

A further embodiment of any of the foregoing embodiments includes a plurality of fan blades rotatable about the axis within a fan blade region of the fan containment case assembly.

In a further embodiment of any of the foregoing embodiments, each of the ballistic liner and the wrap circumferentially surrounds the plurality of fan blades.

In a further embodiment of any of the foregoing embodiments the shell includes a first section, a second section located aft of the first section, and a third section located aft of the second section.

The thermally conforming liner assembly has a forward acoustic liner radially inward of the first section of the shell, an abradable rub layer that defines a clearance gap with the plurality of fan blades, and a honeycomb core between the second section of the shell and the abradable rub layer.

A further embodiment of any of the foregoing embodiments includes a plurality of ribs circumferentially distributed about an outer diameter of the shell, and a plurality of torque blocks mechanically attached to the outer case. At least one torque block of the plurality of torque blocks is positioned between at least one pair of the plurality of ribs to oppose rotation of the shell relative to the outer case.

A gas turbine engine according to an example of the present disclosure includes a fan that has a plurality of fan blades rotatable about an engine longitudinal axis, a compressor section, and a turbine section driving the fan. A fan containment case assembly has an outer case extending about the engine longitudinal axis, and a thermally conforming liner assembly radially inward of the outer case. The liner assembly has a shell, and a wrap between the outer case. The shell at least partially surrounds the plurality of fan blades. The wrap is made of substantially non-impregnated fibers.

In a further embodiment of any of the foregoing embodiments, the fan containment case assembly includes a ballistic liner between the outer case and the wrap.

In a further embodiment of any of the foregoing embodiments, the ballistic liner comprises a metal material.

In a further embodiment of any of the foregoing embodiments, the ballistic liner is made of resin impregnated fibers, the wrap is bonded to an outer diameter of the shell, and the ballistic liner is bonded to the outer case.

In a further embodiment of any of the foregoing embodiments, the outer case is made of a composite material.

A method of assembling a fan containment case according to an example of the present disclosure includes attaching a ballistic liner to an inner diameter of an outer case, preparing a thermally conforming liner assembly, including attaching a wrap to an outer diameter of a shell. The wrap is made of substantially non-impregnated fibers. The method includes positioning the thermally conforming liner assembly radially inward of the ballistic liner.

A further embodiment of any of the foregoing embodiments includes positioning the thermally conforming liner assembly to at least partially surround a plurality of fan blades.

In a further embodiment of any of the foregoing embodiments, the step of preparing includes attaching an acoustic liner to an inner diameter of the shell, attaching a honeycomb core to an inner diameter of the shell, and attaching an abradable rub layer to an inner diameter of the honeycomb core. The abradable rub layer defines a gas flowpath surface adjacent to a plurality of fan blades.

In a further embodiment of any of the foregoing embodiments, the ballistic liner is made of resin impregnated fibers.

In a further embodiment of any of the foregoing embodiments, the step of preparing includes attaching a plurality of ribs to the shell, and the step of positioning includes axially aligning the plurality of ribs between a plurality of torque blocks of the outer case to oppose rotation of the thermally conforming liner assembly relative to the outer case.

The various features and advantages of this disclosure will become apparent to those skilled in the art from the following detailed description. The drawings that accompany the detailed description can be briefly described as follows.

DETAILED DESCRIPTION

Figure 1:
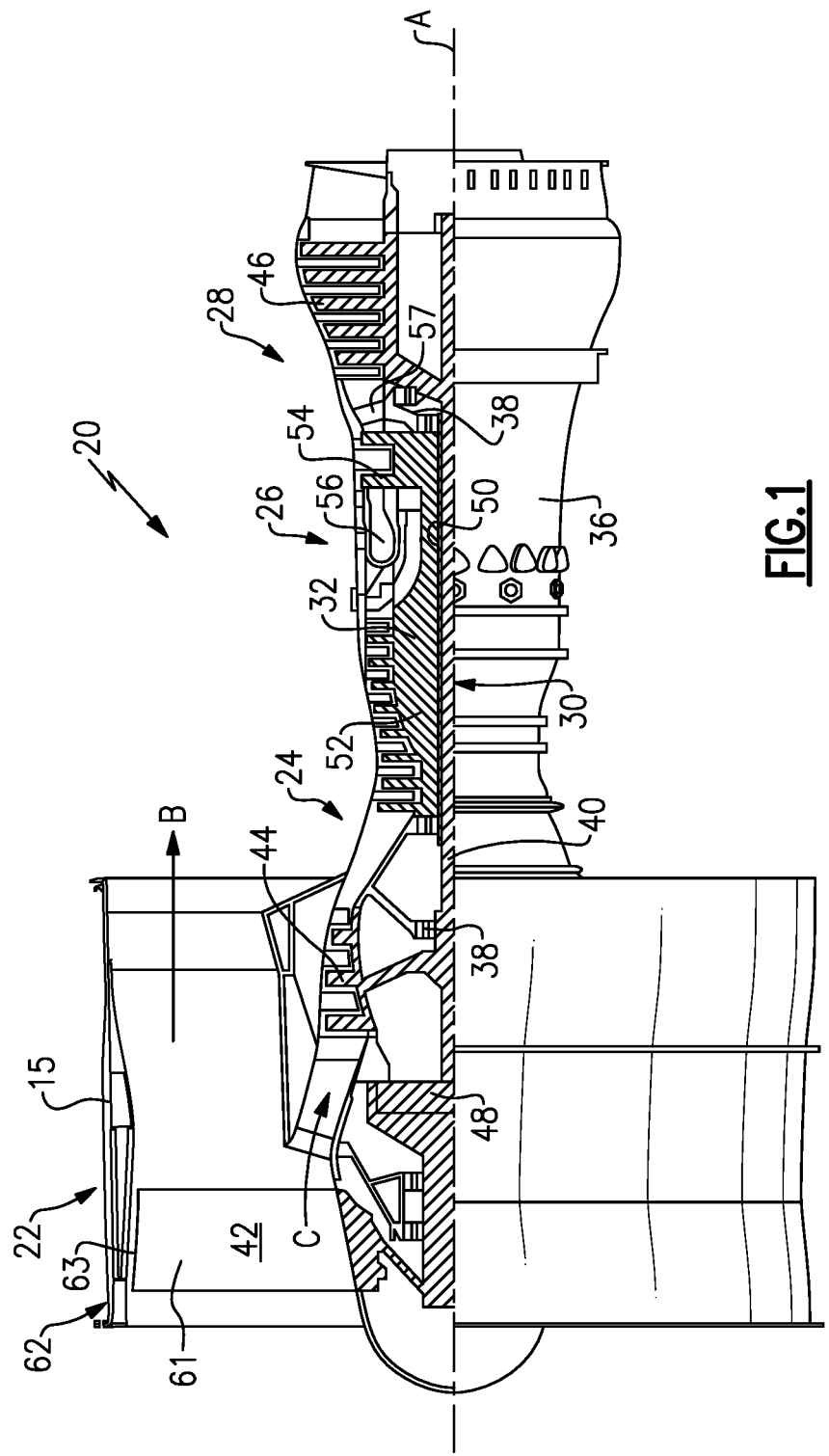
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The fan 42 includes a plurality of fan blades 61 rotatable about the engine central longitudinal axis A. In one example, the fan blades 61 are made of an aluminum alloy. In another example, the fan blades 61 are made of a composite material or titanium.

Figure 2:
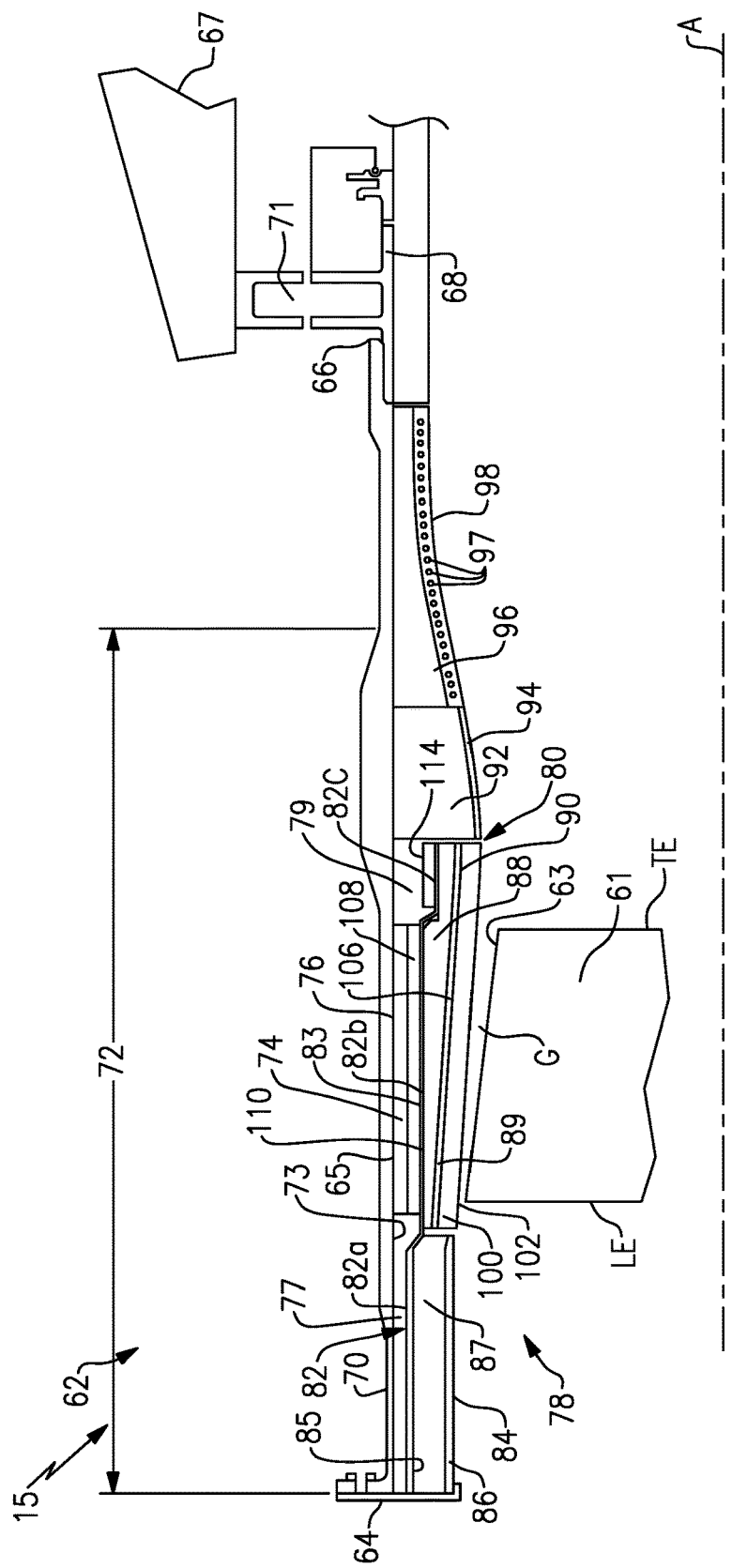
FIG. 2 illustrates a cross-sectional side view of a fan containment system.
Figure 3:
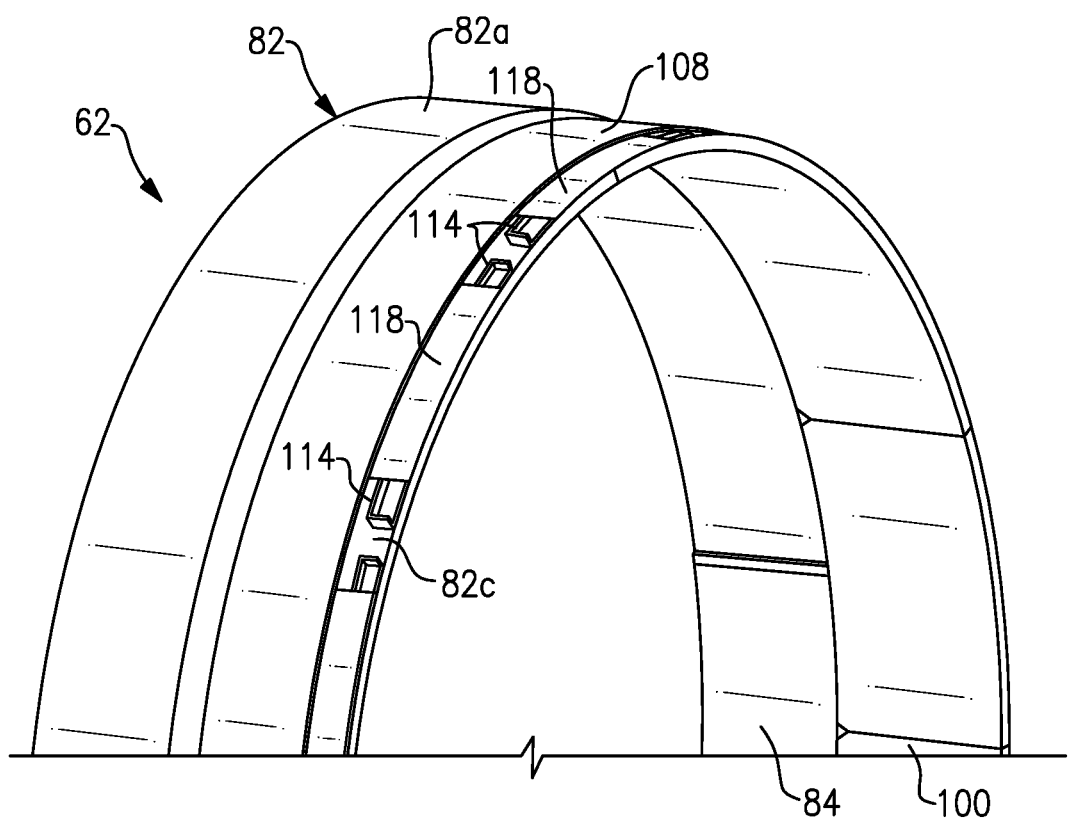
FIG. 3 illustrates a perspective view of selected portions of the fan containment system of FIG. 2.

Referring to FIGS. 2 and 3, nacelle 15 includes a fan containment case system or assembly 62 that at least partially or completely surrounds the fan blades 61. Although a gas turbine engine 20 with a geared architecture 48 is described, the fan containment case assembly 62 can be employed in a gas turbine engine without a geared architecture. Other systems may benefit from the teachings herein, including land based turbines for power generation.

The fan containment case assembly 62 extends circumferentially about the engine centerline axis A to define a generally hoop-shaped geometry or annulus. The fan containment case assembly 62 includes a forward end region 64 and an aft end region 66. The forward end region 64 extends axially forward of leading edges LE of the fan blades 61, and the aft end region 66 extends axially aft of trailing edges TE of the fan blades 61.

The aft end region 66 of the fan containment case assembly 62 can be secured to a front engine mount ring 68, which extends circumferentially about the engine axis A. The front engine mount ring 68 can be mechanically attached to one or more engine mounts 71 to mount the gas turbine engine 20 to a pylon 67 extending from an aircraft. The front engine mount ring 68 can be made of titanium or an aluminum alloy, for example, or another material to structurally support the fan containment case assembly 62 during engine operation.

The fan containment case assembly 62 includes an outer case 70 that extends circumferentially about the engine axis A. The outer casing 70 is relatively stiff and provides a primary structural load path to the engine mounts 71. The outer case 70 can be made of a composite material, such as an organic matrix composite, or can be made of a metal material such as titanium or an aluminum alloy, for example. The organic matrix composite can include a matrix material and reinforcement fibers distributed through the matrix material. The reinforcement fibers may be discontinuous or continuous, depending upon the desired properties of the organic matrix composite, for example. The matrix material may be a thermoset polymer or a thermoplastic polymer. The reinforcement fibers may include carbon graphite, silica glass, silicon carbide, or ceramic. In some embodiments, the outer case 70 is a monolithically formed composite case.

The fan containment case assembly 62 defines a fan blade containment region 72 that is located between the forward end region 64 and the aft end region 66. The fan blade containment region 72 at least partially or completely surrounds the fan blades 61.

The fan containment case assembly 62 includes a ballistic liner 74 located in the fan blade containment region 72. The ballistic liner 74 extends circumferentially about the engine axis A to at least partially or completely surround the fan blades 61. The ballistic liner 74 can be bonded or otherwise mechanically attached to an inner surface 65 of the outer case 70. An elastomeric material 76 can be used to bond the ballistic liner 74 to the inner surface 65 of the outer case 70. The elastomeric material 76 can be polysulfide or silicone rubber, or any other suitable adhesive, for example.

In some embodiments, the ballistic liner 74 is made of an aramid fiber fabric impregnated with epoxy resin. In one embodiment, the ballistic liner 74 is made of Kevlar®, a registered trademark of E.I. du Pont de Nemours and Company of Wilmington, Del. In another embodiment, the ballistic liner 74 can be made of metal such as titanium. The ballistic liner 74 protects the outer case 70 from fan blade shear threats relating to liberation of one of the fan blades 61. The outer case 70 made of resin impregnated aramid fibers can be relatively lighter and more compact than cases made of an aluminum alloy, and can provide relatively greater toughness to blunt sharp loads caused by an impacting fan blade 61.

The fan containment case assembly 62 includes a thermally conforming liner assembly 78 that extends circumferentially about the engine axis A to at least partially or completely surround the fan blades 61 in the fan blade containment region 72. The liner assembly 78 is located radially inward of the outer case 70 and the ballistic liner 74. The thermally liner assembly 78 extends axially from the forward end region 64 of the fan containment case assembly 62 to an area 80 located between the fan blade containment region 72 and the aft end region 66.

The liner assembly 78 includes a generally annular support ring or shell 82 located inwardly of the outer case 70 and the ballistic liner 74. The shell 82 extends circumferentially about the engine axis A. The shell 82 extends axially from the forward end region 64 to the area 80. The shell 82 can be made of titanium, an aluminum, or an aluminum alloy, or other material the produces the desired TSFC effect, for example.

In the illustrated embodiment of FIG. 2, the shell 82 includes a first section 82a, a second section 82b, and a third section 82c. The first section 82a is located forward of the fan blade 61, and the second and third sections 82b, 82c are located in-plane and aft of fan blade 61, respectively, with the third section 82c located aft of the second section 82b. One or more of the sections 82a, 82b and/or 82c can differ in diameter, such as having decreasing or tapering diameters from forward to aft locations as illustrated by FIG. 2.

The fan containment case assembly 62 can include circumferential supports or rings 77, 79 mechanically attached to the outer case 70 to locate the ballistic liner 74. The sections 82a, 82b, 82c of the shell 82 can be contoured to abut the circumferential rings 77, 79, which can be dimensioned to limit relative axial movement. In the illustrated embodiment of FIG. 2, the ballistic liner 74 is not bonded to the shell 82 such that the ballistic liner 74 is moveable relative to the liner assembly 78.

The thermally conforming liner assembly 78 includes a forward acoustic liner 84 radially inward of and mechanically attached to an inner diameter 85 of the first section 82a of the shell 82. In one embodiment, the forward acoustic liner 84 includes an aluminum alloy face sheet 86 that defines an outer gas flowpath surface of the fan 42. The forward acoustic liner 84 can include a honeycomb core 87 radially outward of the face sheet 86. In one embodiment, the honeycomb core 88 is made of an aluminum alloy. The honeycomb core 87 has a construct that attenuates fan noise generated by the fan blades 61.

The thermally conforming liner assembly 78 includes a honeycomb core 88 located between the second section 82b of the shell 82 and an abradable rub layer 100. In the illustrated embodiment of FIG. 2, the honeycomb core 88 is located radially inward of and attached to the second section 82b of the shell 82 in the fan blade containment region 72. In one embodiment, the honeycomb core 88 is made of an aluminum alloy. The honeycomb core 88 can have a generally wedge shape geometry with a thickness that increases in the aft direction with respect to the engine axis A. An inboard liner 90 can be located radially inward of and attached to the honeycomb core 88. In one embodiment, the inboard liner 90 is made of an aluminum alloy.

The abradable rub layer 100 is located radially inward of the inboard liner 90. The abradable rub layer 100 defines a radially inboard surface 102 and a radially outboard surface 106 that is adjacent to the inboard liner 90. The radially inboard surface 102 of the abradable rub layer 100 defines the outer gas flowpath surface adjacent to the fan blades 61, with the radially inboard surface 102 being proximate to a tip 63 of the fan blades 61 to define a clearance gap G. The abradable rub layer 100 can be formed of a relatively compliant material, such as aramid honeycomb filled with epoxy, that can at least partially absorb an impact of the fan blades 61 during contact with the tips 63 during a blade rub event. The abradable rub layer 100 can provide for a relatively tighter clearance between the tips 63 of the fan blades 61 and the fan containment case assembly 62, thereby improving an efficiency of the fan 42. The relatively soft material of the abradable rub layer 100 is damped, which can reduce a modal response in the fan containment case assembly 62.

The fan containment case assembly 62 can include an ice impact liner 94 located axially aft of and adjacent to the third section 82c of the shell 82. The ice impact liner support 92 can be made of an aluminum alloy, and can have a honeycomb core structure or a plurality of honeycomb cells, for example. An impact resistant flowpath liner 94 can be located radially inward of and attached to the ice impact support liner 92. The flowpath liner 94 can be made of an aramid fiber composite material, or other suitable material, for example. The ice impact liner support 92 and ice impact liner 94 are configured to at least partially absorb the impact of ice or other debris deflected by the fan blades 61 or otherwise communicated through the fan section 22.

The fan containment case assembly 62 can include an acoustic liner 98 located axial aft of the ice impact liner 94. The acoustic liner support 96 can be made of an aluminum alloy, and can have a honeycomb core structure or a plurality of honeycomb cells, for example. In some embodiments, the acoustic liner 98 includes perforations 97 and can be filled with a fiberglass material. The acoustic liner 98 can be located inwardly of and attached to the acoustic liner support 96. The liner 98 can be made an aluminum alloy, fiberglass or an aramid fiber, for example. The acoustic liner support 96 has a construct that attenuates fan noise generated by the fan blades 61.

A coefficient of thermal expansion of the outer case 70 can be different from a coefficient of thermal expansion of the ballistic liner 74. The elastomeric material 76 used to bond the ballistic liner 74 to the outer case 70 can have a relatively high elongation and low stiffness and can stretch without generating high stresses. The elastomeric material 76 can accommodate expansion and contraction of the outer case 70 and can reduce a likelihood that the ballistic liner 74 will become debonded from the outer case 70.

The thermally conforming liner assembly 78 includes an intermediate layer or wrap 108 radially inward of the outer case 70 and that at least partially or completely surrounds the fan blades 61. The wrap 108 is between the outer case 70 and the shell 82, with the ballistic liner 74 in between the outer case 70 and the wrap 108. The wrap 108 can directly contact an outer diameter 83 of the shell 82. The wrap 108 can be bonded or otherwise mechanically attached to the outer diameter 83 of the shell 82 utilizing any of the techniques disclosed herein, such as a bond layer 110 deposited on the outer diameter 83. The wrap 108 can be detached from, and moveable relative to, the ballistic liner 74 to allow for relative expansion and contraction. In some embodiments, the wrap 108 is made of a metal material such as aluminum or an aluminum alloy.

The wrap 108 can be made of a non-metallic or composite material such as Kevlar or an aramid fiber weave. In some embodiments, the wrap 108 has a first fiber construction, and the ballistic liner 74 has a second fiber construction that differs from the first fiber construction in stiffness. In some embodiments, the first fiber construction of the wrap 108 is made of substantially non-impregnated or "dry" fibers (i.e., substantially free of resin), and the second fiber construction of the ballistic liner 74 is made of resin impregnated or "resin soaked" fibers that are cured or hardened. For the purposes of this disclosure, the term "substantially" means less than 5 percent of fibers of the fiber construction being impregnated unless otherwise indicated. The fibers of the first fiber construction can be aramid fibers such as fibers made of Kevlar®. Each fiber construction can include a fabric or weave, for example. The weave can be a uniform or asymmetric. The orientation of the fibers of the first and second fiber constructions can be the same or can differ.

Each of the first and second fiber constructions can include one or more layers of material, which each layer having the same or different fiber orientations in the respective fiber construction. For example, the wrap 108 can be made of about 15-20 layers of fibers or any amount needed to provide ballistic shielding to the outer case 70.

A coefficient of thermal expansion of the ballistic liner 74 can be different from a coefficient of thermal expansion of the wrap 108. A fiber construction of the ballistic liner 74 made of mostly resin-impregnated fibers can increase a stiffness of the fan containment case assembly 62, but can be relatively more rigid than the fiber construction of the wrap. A fiber construction of the wrap 108 made of substantial non-impregnated fibers can increase the ability of the fan containment case assembly 62 to flex during thermal contraction and expansion. The wrap 108 being substantially free of resin can also decrease the overall weight of the fan containment case assembly 62 as compared to a resin-impregnated fiber construction.

Figure 4:
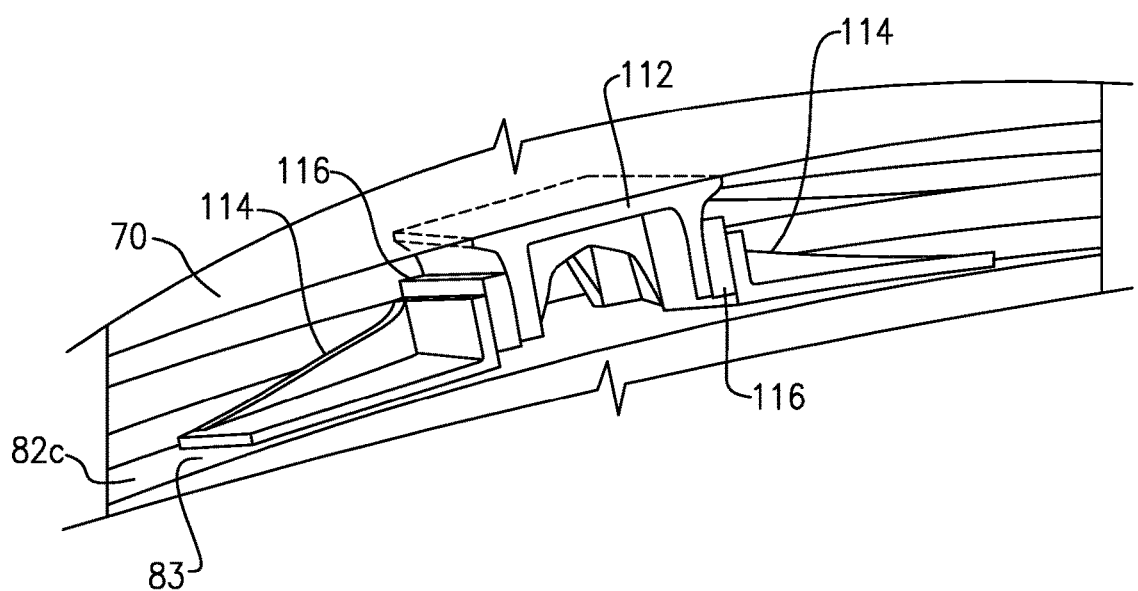
FIG. 4 illustrates a perspective view of a mounting arrangement of the fan containment system of FIG. 3.

Referring to FIGS. 3 and 4, with continued reference to FIG. 2, the fan containment case assembly 62 can include a plurality of torque blocks 112 (FIG. 4) and a plurality of ribs 114 that mate to provide an indexing feature. The ribs 114 can have a generally L-shaped geometry. The ribs 114 can be circumferentially distributed about, and mechanically attached to, the outer diameter 83 of the third section 82c of the shell 82. The torque blocks 112 are circumferentially distributed in a spaced relationship about, and are each mechanically attached to, the inner diameter 73 of the outer case 70. At least one torque block 112 can be positioned between a respective pair of the ribs 114 to oppose rotation of the shell 82 relative to the outer case 70. The torque blocks 112 and ribs 114 can be arranged to permit axial movement of the shell 82 relative to the outer case 70.

One or more interface or guide members 116 (FIG. 4) can be situated between opposed faces of the torque blocks 112 and the ribs 114. The guide members 116 can be formed of a relatively low friction material such as polytetrafluoroethylene (PTFE). The guide members 116 can be configured to guide the torque blocks 112 relative to the ribs 114 during assembly.

The shell 82 can include one or more annular reinforcement members 118 (FIG. 3) interspersed between the ribs 114 and distributed about the outer diameter 83 of the shell 82. The reinforcement members 118 can be made of the same or a different material than the shell 82. The reinforcement members 118 can be mechanically attached to the shell 82, such as by bonding or riveting, and can be made of aluminum or an aluminum alloy, for example. In some embodiments, the reinforcement members 118 are integrally formed with the shell 82. The reinforcement members 118 can increase a rigidity and strength of the shell 82.

Assembly of the fan containment case assembly 62 according to one embodiment is as follows. The liner assembly 78 is pre-assembled or is otherwise prepared. Preparation of the liner assembly 78 includes directly attaching the wrap 108 to the outer diameter 83 of the shell 82. Preparation of the liner assembly 78 can include attaching the acoustic liner 84 to the inner diameter 85 of the shell 82 along the first section 82a, attaching the honeycomb core 88 to the inner diameter 85 of the shell 82 along the second section 82b, and attaching the abradable rub layer 100 to an inner diameter 89 of the honeycomb core 88 via the inboard liner 90. The ribs 114 can be mechanically attached to the shell 82.

Assembly of the fan containment case assembly 62 includes directly attaching the ballistic liner 74 to the inner diameter 73 of the outer case 70. Attachment of the ballistic liner 74 can include applying the elastomeric material 76 as an elastomeric paste on surfaces of the inner diameter 73 of the outer case 70. In one embodiment, the ballistic liner 74 is pre-cured and is bonded to the outer case 70 with the elastomeric material 76. In another embodiment, the ballistic liner 74 is co-cured while being bonded to the outer case 70 in an autoclave.

The liner assembly 78 is then inserted through a front end of the fan containment case assembly 62 and attached together with the outer case 70. The liner assembly 78 can be moved along the engine axis A from a forward direction to an aft direction until the liner assembly 78 is positioned radially inward of the ballistic liner 74 and brought into abutment with area 80 to define circumferential spaces 77, 79. The ribs 114 are axially aligned with and the torque blocks 112 of the outer case 70. The liner assembly 78 is positioned along the engine axis A to at least partially surround the fan blades 61.

By employing a fan containment case assembly 62 using the techniques disclosed herein, the shell 82 and the tip 63 of the fan blades 61 can expand and contract together, which can reduce tip clearances and improve efficiency of the fan 42 due to reduced tip leakage losses.

It should be understood that relative positional terms such as "forward," "aft," "upper," "lower," "above," "below," and the like are with reference to the normal operational attitude of the vehicle and should not be considered otherwise limiting. Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fan section for a gas turbine engine comprising:
   a fan containment case assembly including:
   an outer case extending about an axis;
   a thermally conforming liner assembly radially inward of the outer case, the liner assembly including a shell;
   a wrap radially outward of the shell; and
   a ballistic liner between the outer case and the wrap;
   wherein the wrap has a first fiber construction, the ballistic liner has a second fiber construction that differs from the first fiber construction in stiffness, the wrap directly contacts an outer diameter of the shell, and the first fiber construction of the wrap is made of substantially non-impregnated fibers.

2. The fan section as recited in claim 1, wherein the second fiber construction of the ballistic liner is made of resin impregnated fibers.

3. The fan section as recited in claim 2, wherein the fibers of the first fiber construction are aramid fibers.

4. The fan section as recited in claim 3, wherein the outer case is made of a composite material.

5. The fan section as recited in claim 1, comprising a plurality of fan blades rotatable about the axis within a fan blade region of the fan containment case assembly.

6. The fan section as recited in claim 5, wherein each of the ballistic liner and the wrap circumferentially surrounds the plurality of fan blades.

7. The fan section as recited in claim 5, wherein:
   the shell includes a first section, a second section located aft of the first section, and a third section located aft of the second section; and
   the thermally conforming liner assembly includes a forward acoustic liner radially inward of the first section of the shell, an abradable rub layer defining a clearance gap with the plurality of fan blades, and a honeycomb core between the second section of the shell and the abradable rub layer.

8. The fan section as recited in claim 6, comprising a plurality of ribs circumferentially distributed about the outer diameter of the shell, and a plurality of torque blocks mechanically attached to the outer case, wherein at least one torque block of the plurality of torque blocks being positioned between at least one pair of the plurality of ribs to oppose rotation of the shell relative to the outer case.

9. A gas turbine engine comprising:
   a fan including a plurality of fan blades rotatable about an engine longitudinal axis;
   a compressor section;
   a turbine section driving the fan; and
   a fan containment case assembly comprising:
   an outer case extending about the engine longitudinal axis;
   a thermally conforming liner assembly radially inward of the outer case, the liner assembly including a shell;
   a wrap between the outer case and the shell, at least partially surrounding the plurality of fan blades, and made of substantially non-impregnated fibers; and
   a ballistic liner between the outer case and the wrap.

10. The gas turbine engine as recited in claim 9, wherein the ballistic liner comprises a metal material.

11. The gas turbine engine as recited in claim 9, wherein the ballistic liner is made of resin impregnated fibers, the wrap is bonded to an outer diameter of the shell, and the ballistic liner is bonded to the outer case.

12. A gas turbine engine comprising:
    a fan including a plurality of fan blades rotatable about an engine longitudinal axis;
    a compressor section;
    a turbine section driving the fan; and
    a fan containment case assembly comprising:
    an outer case extending about the engine longitudinal axis;
    a thermally conforming liner assembly radially inward of the outer case, the liner assembly including a shell;
    a wrap between the outer case and the shell, at least partially surrounding the plurality of fan blades, and made of substantially non-impregnated fibers; and
    wherein the outer case is made of a composite material.

13. A method of assembling a fan containment case comprising:
    attaching a ballistic liner to an inner diameter of an outer case;

preparing a thermally conforming liner assembly, including attaching a wrap to an outer diameter of a shell, the wrap made of substantially non-impregnated fibers; and positioning the thermally conforming liner assembly radially inward of the ballistic liner.

14. The method as recited in claim 13, comprising positioning the thermally conforming liner assembly to at least partially surround a plurality of fan blades.

15. The method as recited in claim 14, wherein the step of preparing includes attaching an acoustic liner to an inner diameter of the shell, attaching a honeycomb core to an inner diameter of the shell, and attaching an abradable rub layer to an inner diameter of the honeycomb core, the abradable rub layer defining a gas flowpath surface adjacent to a plurality of fan blades.

16. The method as recited in claim 13, wherein the ballistic liner is made of resin impregnated fibers.

17. The method as recited in claim 13, wherein the step of preparing includes attaching a plurality of ribs to the shell, and the step of positioning includes axially aligning the plurality of ribs between a plurality of torque blocks of the outer case to oppose rotation of the thermally conforming liner assembly relative to the outer case.

18. The fan section as recited in claim 1, wherein the outer case is made of a composite material.

19. The gas turbine engine as recited in claim 9, wherein the outer case is made of a composite material.

20. The method as recited in claim 13, wherein the outer case is made of a composite material.

* * * * *